United States Patent Office 2,864,831
Patented Dec. 16, 1958

2,864,831

11α-HYDROXY-1-DEHYDROMETHYLTESTOSTER-
ONE AND THE ESTERS THEREOF

Samuel H. Eppstein, Galesburg, and Peter D. Meister, Kalamazoo Township, Kalamazoo County, Mich., and Adolph Weintraub, Brooklyn, N. Y., assignors to The Upjohn Company, Kalamazoo, Mich., a corporation of Michigan No Drawing. Application August 21, 1956
Serial No. 605,424

6 Claims. (Cl. 260—397.45)

The present invention relates to steroid compounds and is more particularly concerned with 11α-hydroxy-1-dehydromethyltestosterone (11α,17β-dihydroxy - 17α - methyl-1,4-androstadiene-3-one) and the esters thereof.

The invention is a continuation-in-part of application Serial Number 493,302, now abandoned, filed March 9, 1955.

The compounds of the present invention are illustratively represented by the formula:

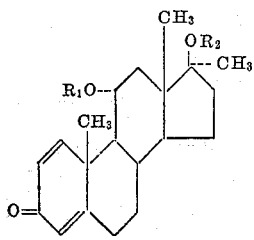

wherein $R_1$ and $R_2$ are selected from the group consisting of hydrogen and acyl, in which the acyl group is selected from the group consisting of an organic carboxylic, arylsulfonic acid and preferably selected from the group consisting of a hydrocarbon carboxylic acid and a benzenesulfonic acid containing from one to eight carbon atoms, inclusive.

The process of the present invention comprises: oxidative fermentation of 17β-hydroxy-17α-methyl-1,4-androstadiene-3-one or a 17β-ester thereof by a fungus, especially a fungus of the genus Sporotrichum to give 11α,17β-dihydroxy-17α-methyl-1,4-androstadien-3-one.

Esterification may be accomplished by admixing 11α,17β - dihydroxy-17α-methyl-1,4-androstadien - 3 - one with an acylating agent such as, for example, ketene, a ketene of a selected acid, an acid, acid chloride or acid anhydride, or other known acylating agents usually in a solvent such as, for example, pyridine or the like, or an inert solvent including solvents like benzene, toluene, ether, and the like, for example, and heated at a temperature between about zero degrees centigrade and the boiling point of the reaction mixture. Usually the reaction mixture is kept at about room temperature for a period between about one half hour and about 96 hours, if an 11α-ester of 11α,17β-dihydroxy-17α-methyl-1,4-androstadien-3-one is desired.

If a diester is desired 11α,17β-dihydroxy-17α-methyl-1,4-androstadien-3-one is admixed with an acid anhydride or an acid chloride in the absence of other catalysts and heated to a temperature of about 70 to 120 degrees centigrade for one to twelve hours. In case an acid anhydride, liquid at room temperature, is used, it is preferred not to use any solvent. With acyl halides, pyridine as solvent is preferred. The time of reaction as well as the temperature at which the reaction is carried out, the acylating agent and the ratio of reactants may be varied. The reaction mixture is suitably poured onto ice or cold water, the product collected in an appropriate solvent which is thereafter washed with successive portions of mildly basic solution and water to obtain a solution of the product which is essentially neutral.

In some instances the product may crystallize from the reaction mixture, in which case it may be advantageous to separate the product by filtration or other means, wash with water and thereafter purify by conventional means, such as, for example, by recrystallization from a suitable solvent or by chromatographic purification as deemed necessary.

The thus described acylation process, and as illustrated in more detail in the examples following in the specification, produces both the mono-esters and the di-esters in different proportions depending upon the proportions of acylating agent (i. e. one or more than two equivalents of acylating agent per mole of steroid) and temperatures used in the esterification process.

It is an object of the present invention to provide 11α,17β-dihydroxy-17α-methyl-1,4-androstadien 3-one and the 11α-monoester and 11α,17β-diesters thereof. It is a particular object of the present invention to provide 11α-acyloxy - 17β -hydroxy - 17α - methyl - 1,4, -androstradien-3-one and 11α,17β-diacyloxy-17α-methyl-1,4-androstadien-3-one wherein the acyl radical is selected from the group consisting of the acyl radical of a hydrocarbon carboxylic acid containing from one to eight carbon atoms, inclusive, and of a benzenesulfonic acid containing from six to eight carbon atoms, inclusive. Another object of the present invention is the provision of a process for the production of such steroids. Other objects will be apparent to those skilled in the art to which this invention pertains.

The compounds of the present invention 11α,17β-dihydroxy-17α-methyl-1,4-androstadien-3-one and the esters thereof are important oral anabolic reagents with relatively little androgenic activity compared to methyltestosterone. They are therefore useful agents in the treatment of patients where greater protein anabolic activity is desirable without simultaneous increase in androgenic activity. Oxidation of the 11α-hydroxy group of 11α,17β-dihydroxy-17α-methyl-1,4-androstadien-3-one with chomic acid gives the 1-dehydro-11-keto-17α-methyltestosterone which also is a useful anabolic reagent.

The starting material in the instant application, 17β-hydroxy-17α-methyl-1,4-androstadien-3-one is prepared by fermentation of 17α-methyltestosterone with Septomyxa as described in detail in Preparation 1.

The following examples are illustrative of the process and products of the present invention, but are not to be construed as limiting.

PREPARATION 1

17β - hydroxy - 17α - methyl - 1,4 - androstadien - 3 - one
(1-dehydromethyltestosterone)

One hundred liters of a medium containing one percent Cerelose dextrose, two percent corn steep liquor containing sixty percent solids and adjusted to a pH of 5, was sterilized by heating for 45 minutes at twenty pounds pressure in a fermentor. After cooling the pH was determined to be 5.15. This fermentation mixture was inoculated with six liters of a 24 hour aerobic growth of Septomyxa affinis. During the following 24 hours of growth, 250 milliliters of lard oil containing ten percent of octadecanol was added to reduce foaming. The pH was now 5.6. To this mixture 25 grams of 17α-methyltestosterone, dissolved in 250 milliliters of hot absolute alcohol, was added and washed in with 150 milliliters of alcohol. After an additional 24 hours of conversion, the fermentation was terminated. The pH was now 7.3. Dilute sulfuric acid was added to the mixture to bring the pH down to 3. Thereupon one kilogram of Celite diatomaceous earth was added and the beer was then filtered. The mycelial cake was washed twice with twelve liter volumes of acetone and twice with twelve liter volumes of methylene chloride. These washings were used for the first extraction of the beer filtrate. The beer filtrate was washed three more times with 24-liter volumes of methylene chloride. The combined solvent extracts were washed twice with twelve-liter volumes of two percent sodium bicarbonate and once with 24 liters of water and finally dried over anhydrous sodium sulfate. The solvent was then removed in vacuo. An aliquot, analyzed by paper chromatography, showed about one percent methyltestosterone and a large proprotion of 1-dehydromethyltestosterone.

The extractives were triturated twice with fifty-milliliter volumes of Skellysolve B hexanes, then four times with fifty-milliliter volumes of Skellysolve B-ether (4:1). The residue of brown crystals weighed 18.54 grams (74.6 percent yield), melting point 162 to 167 degrees centigrade. Paper chromatography showed only a single component. Recrystallization from ether and chloroform gave material of melting point 169 to 171 degrees centigrade and rotation $[\alpha]_D^{21} + 0.2$ degree (in $CHCl_3$, C 2.03);

$$\lambda_{max.}^{alc.} \ 246 \ m\mu$$

E=15,600. Hydroxyl at 3430 cm.$^{-1}$; conjugated ketone at 1658 cm.$^{-1}$; $\Delta^{1,4}$-system at 1620 and 1598 cm.$^{-1}$.

Analysis.—Calcd. for $C_{20}H_{28}O_2$: C, 79.95; H, 9.39. Found: C, 80.21; H, 9.63.

EXAMPLE 1

11α,17β-dihydroxy-17α-methyl-1,4 - androstadien - 3 - one (11α-hydroxy-1-dehydromethyltestosterone)

One hundred liters of a medium containing one percent Cerelose dextrose, two percent corn steep liquor (sixty percent solids), and tap water, was adjusted to a pH of five with 25 percent sodium hydroxide solution. Thereto was added 400 milliliters of lard oil-octadecanol as an antifoaming agent. This medium was sterilized for 45 minutes at twenty pounds pressure and inoculated with six liters of a 24-hour growth of Sporotrichum sulfurescens v. Beyma, which strain was obtained from Centraalbureau voor Schimmelcultures, Baarn, Holland. The medium was agitated with a sweep stirrer at 200 R. P. M., and sterile air admitted through a sparger at a rate of two liters per minute. After a period of 24 hours, sixteen grams of 1-dehydromethyltestosterone containing nine percent impurity of methyltestosterone, dissolved in 200 milliliters of hot absolute ethanol, was added. The pH was now 4.8. The fermentation was stopped after 24 hours the pH being then 5.1. The beer was filtrated through a 20 inch Knight-Ware vacuum filter. The tank and filter were washed with twenty liters of water. The mycelium on the filter was dried with two portions of twelve liters of acetone and extracted with two portions of twelve liters of methylene chloride. The beer filtrate was extracted once with 24 liters of methylene chloride, a second time with the 48 liters of extract from the mycelium-cake extraction, and twice more with 24 liters each of methylene chloride. The combined beer extracts were washed with twelve liters of two percent sodium bicarbonate, once with 24 liters of water, and dried with anhydrous sodium sulfate. The dry extract was concentrated in a precision flash evaporator to aproximately one liter, then to dryness under an exhaust hood door. The dry residue weighed 330 grams. It was dissolved in 780 milliliters of benzene and run through an alumina column (the alumina—1000 grams—was acid washed and dried at 120 degrees centigrade). Eluate fractions of 780 milliliters were taken as shown in Table I.

TABLE I

| Fraction No. | Solvent | Volume in milliliters | Solid weight in grams |
|---|---|---|---|
| 1-2 | Benzene | 1,560 | 250.49 |
| 3-4 | Benzene—10% ether | 1,560 | 6.07 |
| 5-6 | Benzene—30% ether | 1,560 | 5.61 |
| 7 | Benzene—50% ether | 780 | 2.15 |
| 8 | Benzene—50% ether | 780 | 1.81 |
| 9 | Ether | 780 | 6.13 |
| 10 | Ether | 780 | 14.99 |
| 11 | Ether—5% chloroform | 780 | 4.08 |
| 12 | Ether—5% chloroform | 780 | 1.35 |
| 13 | Ether—10% chloroform | 780 | 0.38 |
| 14 | Ether—10% chloroform | 780 | 0.18 |
| 15 | Ether—30% chloroform | 780 | 0.18 |
| 16 | Ether—30% chloroform | 780 | 0.25 |
| 17 | Ether—50% chloroform | 780 | 0.42 |
| 18 | Ether—50% chloroform | 780 | 1.14 |
| 19 | Chloroform | 780 | 0.74 |
| 20 | Chloroform | 780 | 0.25 |
| 21 | Chloroform—5% acetone | 780 | 7.50 |
| 22 | Acetone | 780 | 8.05 |
| 23 | Methanol | 780 | 2.20 |

Fraction 22 was evaporated to give 8.05 grams of solids, then redissolved in a mixture consisting of 100 milliliters of ethyl acetate and fifty milliliters of methanol. This mixture was filtered and the solution was concentrated to 35 milliliters to yield 5.52 grams of crystals of melting point 249.5 to 252.5. This material was recrystallized once more from seventy milliliters of methanol-ethyl acetate in a ratio of six to one to give 4.03 grams of crystals of melting point 250 to 253 and rotation $[\alpha]_D^{23}$ minus 33 degrees in chloroform;

$$\lambda_{max.}^{alc.} \ 249 \ and \ 264$$

E 17,100 and 11,000; infrared; OH, 3640 cm.$^{-1}$, 3410 cm.$^{-1}$; conjugated ketone, 1660 cm.$^{-1}$; $\Delta^{1,4}$ C=C, 1617, 1600 cm.$^{-1}$.

Analysis.—Calcd. for $C_{20}H_{28}O_3$: C, 75.91; H, 8.92. Found: C, 76.17; H, 9.15.

EXAMPLE 2

11α-acetoxy-17β-hydroxy-71α-methyl-1,4-androstadien-3-one

A mixture was prepared containing 500 milligrams of 11α,17β-dihydroxy-17α-methyl-1,4-androstadien - 3 - one, four milliliters of acetic anhydride and four milliliters of pyridine. This mixture was allowed to stand at room temperature (22 to 25 degrees centigrade) for a period of sixteen hours, thereupon poured into fifty milliliters of ice water, and the aqueous mixture extracted with three 25-milliliter portions of methylene chloride. The methylene chloride extracts were combined, evaporated and the solid residue recrystallized from methanol to give 11α-acetoxy-17β-hydroxy-17α-methyl-1,4-androstadien-3-one.

EXAMPLE 3

11α-propionyloxy-17β-hydroxy-17α-methyl-1,4-androstadien-3-one

In the same manner given in Example 3, reacting 11α,17β-dihydroxy-17α-methyl-1,4-androstadien-3-one in pyridine solution with propionic anhydride yielded 11α-propionyloxy-17β-hydroxy-17α-methyl-1,4 - androstadien-3-one.

EXAMPLE 4

11α-butyryloxy-17β-hydroxy-17α-methyl-1,4-androstadien-3-one

In the same manner given in Example 3, reacting 11α,17β-dihydroxy-17α-methyl-1,4-androstadien-3-one in pyridine solution with butyric anhydride yielded 11α-butyryloxy-17β-hydroxy-17α-methyl-1,4-androstadien-3-one.

EXAMPLE 5

*11α-valeryloxy-17β-hydroxy-17α-methyl-1,4-androstadien-3-one*

In the same manner given in Example 3, reacting 11α, 17β-dihydroxy-17α-methyl-1,4-androstadien-3-one in pyridine solution with valeric anhydride yielded 11α-valeryloxy-17β-hydroxy-17α-methyl-1,4-androstadien-3-one.

EXAMPLE 6

*11α-hexanoyloxy-17β-hydroxy-17α-methyl-1,4-androstadien-3-one*

In the same manner given in Example 3, reacting 11α, 17β-dihydroxy-17α-methyl-1,4-androstadien-3-one in pyridine solution with hexanoyl bromide yielded 11α-hexanoyloxyl-17β-hydroxy-17α-methyl - 1,4 - androstadien-3-one.

EXAMPLE 7

*11α-heptanoyloxy-17β-hydroxy-17α-methyl-1,4-androstadien-3-one*

In the same manner given in Example 3, reacting 11α, 17β-dihydroxy-17α-methyl-1,4-androstadien-3-one in pyridine solution with heptanoyl bromide yielded 11α-heptanoyloxy-17β-hydroxy-17α-methyl - 1,4 - androstadien-3-one.

EXAMPLE 8

*11α-octanoyloxy-17β-hydroxy-17α-methyl-1,4-androstadien-3-one*

In the same manner given in Example 3, reacting 11α, 17β-dihydroxy-17α-methyl-1,4-androstadien-3-one in pyridine solution with octanoyl chloride yielded 11α-octanoyloxy-17β-hydroxy-17α-methyl-1,4-androstadien-3-one.

EXAMPLE 9

*11α-benzoyloxy-17β-hydroxy-17α-methyl-1,4-androstadien-3-one*

In the same manner given in Example 3, reacting 11α,17β-dihydroxy-17α-methyl-1,4-androstadien-3-one in pyridine solution with benzoyl chloride yielded 11α-benzoyloxy - 17β - hydroxy-17α-methyl-1,4-androstadien-3-one.

EXAMPLE 10

*11α-phenylacetoxy-17β-hydroxy-17α-methyl-1,4-androstadien-3-one*

In the same manner given in Example 3, reacting 11α,17β-dihydroxy-17α-methyl-1-4-androstadien-3-one in pyridine solution with phenylacetyl bromide yielded 11α-phenylacetoxy - 17β - hydroxy - 17α - methyl - 1,4 - androstadien-3-one.

EXAMPLE 11

*11α-phenylpropionyloxy-17-β-hydroxy-17α-methyl-1,4-androstadien-3-one*

In the same manner given in Example 3, reacting 11α,17β-dihydroxy-17α-methyl-1,4-androstadien-3-one in pyridine solution with phenylpropionyl yielded 11α-phenylpropionyloxy - 17β - hydroxy - 17α - methyl - 1,4 - androstadien-3-one.

EXAMPLE 12

*11α-toluyloxy-17β-hydroxy-17α-methyl-1,4-androstadien-3-one*

In the same manner given in Example 3, reacting 11α,17β - dihydroxy-17α-methyl-1,4-androstadien-3-one in pyridine solution with toluyl chloride yielded 11α-toluyloxy-17β-hydroxy-17α-methyl-1,4-androstadien-3-one.

EXAMPLE 13

*11α-anisoyloxy-17β-hydroxy-17α-methyl-1-4-androstadien-3-one*

In the same manner given in Example 3, reacting 11α,17β-dihydroxy-17α-methyl-1,4-androstadien-3-one in pyridine solution with anisoyl chloride yielded 11α-anisoyloxy-17β-hydroxy-17α-methyl-1,4 androstadiene-3-one.

EXAMPLE 14

*11α-chloroacetoxy-17β-hydroxy-17α-methyl-1,4-androstadien-3-one.*

In the same manner given in Example 3, reacting 11α, 17β - dihydroxy - 17α - methyl - 1,4-androstadien-3-one in pyridine solution with chloroacetyl chloride yielded 11α-chloroacetoxy - 17β-hydroxy-17α-methyl-1,4-androstadiene-3-one.

EXAMPLE 15

*11α-benzenesulfonyloxy-17β-hydroxy-17α-methyl-1,4-androstadien-3-one*

In the same manner given in Example 3, reacting 11α,17β - dihydroxy-17α-methyl-1,4-androstadien-3-one in pyridine solution with benzenesulfonylchloride yielded 11α - benezene - sulfonyloxy-17β-hydroxy-17α-methyl-1,4-androstadien-3-one.

EXAMPLE 16

*11α-toluenesulfonyloxy-17β-hydroxy-17α-methyl-1,4-androstadien-3-one*

In the same manner given in Example 3, reacting 11α-17β-dihydroxy-17α-methyl-1,4-androstadien-3-one in pyridine solution with toluenesulfonyl chloride yielded 11α - toluenesulfonyloxy - 17β - hydroxy-17α-methyl-1,4-androstadien-3-one.

EXAMPLE 17

*11α-(β-cyclopentylpropionloxy)-17β-hydrovy-17α-methyl-1,4-androstadien-3-one*

In the same manner given in Example 3, reacting 11α-17β-dihydroxy-17α-methyl-1,4-androstadien-3-one in pyridine solution with β-cyclopentylpropionyl chloride yielded 11α - (β - cyclopentylpropionyloxy)-17β-hydroxy-17α-methyl-1,4-androstadien-3-one.

In the same manner as shown in Examples 3 through 18, other 11α-acyloxy-17β-hydroxy-17α-methyl-1,4-androstadien-3-ones are produced by reacting at room temperature 11α,17β-dihydroxy-17α-methyl-1,4-androstadien-3-one with an acid anhydride or acid halide in solution such as in pyridine to obtain the corresponding 11α-acyloxy-17β-hydroxy-17α-methyl-1,4 - androstadien-3-one. Representative 11α-acyloxy-17β-hydroxy-17α-methyl-1,4-androstadien-3-ones thus obtained include the 11α-isobutyrate, isovalerate, cinnamate, acid tartrate, acid succinate, dihydrogencitrate, salicylate, 3,5-dinitrobenzenesulfonate, ortho-, meta-, parachlorobenzenesulfonate, nicotinate, 2-furoate, acid maleate, acid fumarate, crotonate, acrylate, and the like acylates of 11α,17β-dihydroxy-17α-methyl-1,4-androstadien-3-one.

EXAMPLE 18

*11α,17α-diacetoxy-17α-methyl-1,4-androstadien-3-one*

A solution of 0.5 gram of 11α,17β-dihydroxy-17α-methyl-1,4-androstadien-3-one in ten milliliters of acetic anhydride was refluxed for a period of four hours. Thereafter, the excess of acetic anhydride was distilled off in a vacuum until about one to two milliliters of solution was left. This solution was poured into fifty milliliters of ice water, the precipitate thus formed collected on filter paper, and repeatedly recrystallized from ethyl acetate-acetone to give pure 11α, 17β-diacetoxy-17α-methyl-1,4-androstadien-3-one.

EXAMPLE 19

*11α,17β-dipropionyloxy-17α-methyl-1,4-androstadien-3-one*

A solution of 0.5 gram of 11α,17β-dihydroxy-17α-methyl-1,4-androstadien-3-one in ten milliliters of propionic acid was heated for six hours on the water bath at 100 degrees. The mixture was thereupon distilled in vacuo until two milliliters of solution remained which were thereupon poured into ice water, the precipitate thus formed collected on filter and the thus obtained precipitate recrystallized from methanol to give 11α,17β-dipropionyloxy-17α-methyl-1,4-androstadiene-3-one.

EXAMPLE 20

*11α,17β-dibenzoyloxy-17α-methyl-1,4-androstadien-3-one*

A solution of 0.5 gram of 11α,17β-dihydroxy-17α-methyl-1,4-androstadien-3-one in five milliliters of benzoyl chloride and five milliliters of pyridine was heated on the water bath for a period of eight hours at 100 degrees. The mixture was thereupon distilled in vacuo until a residue of approximately one to two milliliters remained in the flask. This residue was transferred into ice water, stirred and the thus obtained precipitate collected on a filter. The thus obtained precipitate was recrystallized from methanol to give 11α,17β-dibenzoyloxy-17α-methyl-1,4-androstadien-3-one.

EXAMPLE 21

*11α,17β-dibutyryloxy-17α-methyl-1,4-androstadien-3-one*

In the same manner given in Example 20, heating a solution of 11α,17β-dihydroxy-17α-methyl-1,4-androstadien-3-one in butyric anhydride produced 11α,17β-dibutyryloxy-17α-methyl-1,4-androstadien-3-one.

EXAMPLE 22

*11α,17β-divaleryloxy-17α-methyl-1,4-androstadien-3-one*

In the same manner given in Example 20, heating a solution of 11α,17β-dihydroxy-17α-methyl-1,4-androstadien-3-one in valeric anhydride produced 11α,17β-divaleryloxy-17α-methyl-1,4-androstadien-3-one.

EXAMPLE 23

*11α,17β-dihexanoyloxy-17α-methyl-1,4-androstadien-3-one*

In the same manner given in Example 20, heating a solution of 11α,17β-dihydroxy-17α-methyl-1,4-androstadien-3-one in hexanoic anhydride produced 11α,17β-dihexanoyloxy-17α-methyl-1,4-androstadien-3-one.

EXAMPLE 24

*11α,17β-dihemisuccinyloxy-17α-methyl-1,4-androstadien-3-one*

In the same manner given in Example 20, heating a solution of 11α,17β-dihydroxy-17α-methyl-1,4-androstadien-3-one in pyridine with succinic anhydride produced 11α,17β-dihemisuccinyloxy-17α-methyl-1,4-androstadien-3-one.

EXAMPLE 25

*11α,17β-dihemimaleyloxy-17α-methyl-1,4-androstadien-3-one*

In the same manner given in Example 20, heating a solution of 11α,17β-dihydroxy-17α-methyl-1,4-androstadien-3-one in pyridine with maleic anhydride produced 11α,17β-dihemimaleyloxy-17α-methyl-1,4-androstadien-3-one.

EXAMPLE 26

*11α,17β-dioctanoyloxy-17α-methyl-1,4-androstadien-3-one*

In the same manner given in Example 21, heating a solution of 11α,17β-dihydroxy-17α-methyl-1,4-androstadien-3-one in pyridine and octanoyl chloride yielded 11α,17α-dioctanoyloxy-17α-methyl-1,4-androstadien-3-one.

EXAMPLE 27

*11α,17β-di-(β-cyclopentylpropionyloxy)-17α-methyl-1,4-androstadien-3-one*

In the same manner given in Example 21, heating a solution of 11α,17β-dihydroxy-17α-methyl-1,4-androstadien-3-one in pyridine and β-cyclopentylpropionyl chloride, yielded 11α,17α-di-(β-cyclopentylpropionyloxy)-17α-methyl-1,4-androstadien-3-one.

EXAMPLE 28

*11α,17β-di-(trimethylacetoxy)-17α-methyl-1,4-androstadien-3-one*

In the same manner given in Example 21, heating a solution of 11α,17β-dihydroxy-17α-methyl-1,4-androstadien-3-one in pyridine and trimethylacetyl chloride, yielded 11α,17α-di-(trimethylacetoxy)-17α-methyl-1,4-androstadien-3-one.

EXAMPLE 29

*11α,17β-di-(phenylacetoxy)-17α-methyl-1,4-androstadien-3-one*

In the same manner given in Example 21, heating a solution of 11α,17β-dihydroxy-17α-methyl-1,4-androstadien-3-one in pyridine and phenylacetyl chloride, yielded 11α,17α-di-(phenylacetoxy)-17α-methyl-1,4-androstadien-3-one.

EXAMPLE 30

*11α,17β-di-(anisoyloxy)-17α-methyl-1,4-androstadien-3-one*

In the same manner given in Example 21, heating a solution of 11α,17β-dihydroxy-17α-methyl-1,4-androstadien-3-one in pyridine and anisoyl chloride yielded 11α,17α-di(anisoyloxy)-17α-methyl-1,4-androstadien-3-one.

EXAMPLE 31

*11α,17β-di-(phenylpropionyloxy)-17α-methyl-1,4-androstadien-3-one*

In the same manner given in Example 21, heating a solution of 11α,17β-dihydroxy-17α-methyl-1,4-androstadien-3-one in pyridine and phenylpropionyl chloride yielded 11α,17α-di-(phenylpropionyloxy)-17α-methyl-1,4-androstadien-3-one.

In the same manner as shown in Examples 19 through 32, heating a solution of 11α,17β-dihydroxy-17α-methyl-1,4-androstadien-3-ones, such as, for example, the di-isoacid halide produces other 11α,17β-diacyloxy-17α-methyl-1,4-androstadien-3-ones, such as for example, the di-isobutyrate, di-isovalerate, di-heptanoate, di-chloroacetate, di-bromoacetate, di-iodoacetate, di-fluoroacetate, di-nicotinate, di-2-furoate, di-toluenesulfonate, di-benzenesulfonate, di-ortho-, meta- and parachlorobenzenesulfonate, di-3,5-dinitrobenzenesulfonate, or the like of 11α,17β-dihydroxy-17α-methyl-1,4-androstadien-3-one.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A 1,4-androstadiene of the formula:

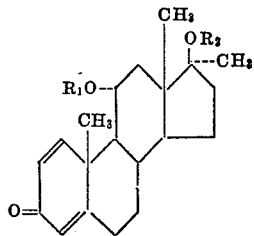

wherein $R_1$ and $R_2$ are selected from the group consisting of hydrogen and acyl in which the acyl group is selected from the group consisting of hydrocarbon carboxylic acid containing from one to eight carbon atoms, inclusive, and a benzenesulfonic acid containing from one to eight carbon atoms, inclusive.

2. $11\alpha,17\beta$ - dihydroxy-17$\alpha$-methyl-1,4-androstadien-3-one.

3. $11\alpha$-acetoxy - 17$\beta$-hydroxy-17$\alpha$-methyl-1,4-androstadien-3-one.

4. $11\alpha$ - propionyloxy - 17$\beta$ - hydroxy-17$\alpha$-methyl-1,4-androstadien-3-one.

5. $11\alpha$ - benzoyloxy - 17$\beta$ - hydroxy - 17$\alpha$-methyl-1,4-androstadien-3-one.

6. $11\alpha,17\beta$ - diacetoxy-17$\alpha$-methyl-1,4-androstadien-3-one.

References Cited in the file of this patent
UNITED STATES PATENTS

| | | |
|---|---|---|
| 2,695,907 | Murray | Nov. 30, 1954 |
| 2,768,189 | Nominee | Oct. 23, 1956 |

UNITED STATES PATENT OFFICE

Certificate of Correction

December 16, 1958

Patent No. 2,864,831

Samuel H. Eppstein et al.

It is hereby certified that error appears in the printed specification of the above numbered patent requiring correction and that the said Letters Patent should read as corrected below.

Column 2, line 22, for "11α-monoester" read —11α-monoesters—; column 3, line 17, for "proprotion" read —proportion—; column 4, line 42, Example 2, in the heading thereto for "-71α-" read — -17α- —; line 62, for "Example 3" read —Example 2—; column 6, line 26, for "-benezene-" read — -benzene- —; line 40, Example 17, in the heading thereto, for "-(β-cyclopentylpropionloxy)-" read — -(β-cyclopentylpropionyloxy)- —; same line 40, for "-hydrovy-" read — -hydroxy- —; lines 47 and 48, for "Examples 3 through 18" read —Examples 3 through 17—; column 8, lines 59 and 60, for "Examples 19 through 32" read —Examples 19 through 31—; lines 61 and 62, for "-3-ones, such, as for example, the di-iso-acid halide produces" read — -3-one in an acid anhydride, or in an acid halide produces—.

Signed and sealed this 13th day of October 1959.

[SEAL]

Attest:
KARL H. AXLINE,
Attesting Officer.

ROBERT C. WATSON,
Commissioner of Patents.